United States Patent [19]

Shinozaki

[11] Patent Number: 5,303,284
[45] Date of Patent: Apr. 12, 1994

[54] RINGING CIRCUIT FOR USE IN PORTABLE TELEPHONE SET

[75] Inventor: Nobuhisa Shinozaki, Tokyo, Japan
[73] Assignee: NEC Corporation, Tokyo, Japan
[21] Appl. No.: 648,759
[22] Filed: Jan. 31, 1991
[30] Foreign Application Priority Data
Jan. 31, 1990 [JP] Japan .................................. 2-21233
[51] Int. Cl.$^5$ .................... H04M 11/00; H04M 3/00; H04M 1/00
[52] U.S. Cl. ..................................... 379/58; 379/388; 379/418; 379/375
[58] Field of Search ...................... 379/56, 58, 63, 387, 379/388, 390, 418, 60, 61, 374, 375

[56] References Cited

U.S. PATENT DOCUMENTS

| | | | |
|---|---|---|---|
| 4,421,952 | 12/1983 | Barnes ................................. | 379/418 |
| 4,650,931 | 3/1987 | Tsukada et al. ..................... | 379/388 |
| 5,025,467 | 6/1991 | Wheller ............................... | 379/60 |

FOREIGN PATENT DOCUMENTS

0222548  9/1989  Japan ................................. 379/418

*Primary Examiner*—Curtis Kuntz
*Assistant Examiner*—William D. Cumming
*Attorney, Agent, or Firm*—Sughrue, Mion, Zinn, Macpeak & Seas

[57] ABSTRACT

A portable telephone set having a ringing circuit for producing different ringing tones depending upon the use mode of the portable telephone set, a portable mode or a mobile mode. The ringing circuit comprises a mode detecting circuit for detecting the use mode, an internal loudspeaker housed in a housing of the portable telephone set for producing a first ringing signal when the portable telephone set is in the portable mode, an external loudspeaker connected externally of the housing for producing a second ringing signal when it is in the mobile mode and a ringing tone generator for generating a first and a second ringing tones for driving the respective loudspeakers producing first and second ringings. The first and second ringing tones have frequency spectra compatible with frequency characteristics of these loudspeakers to produce the respective ringings efficiently. The ringing signal generator may be a single ringing tone generating circuit producing two kinds of ringing tone or may be comprised of two different ringing tone generating circuits.

16 Claims, 5 Drawing Sheets

RINGING CIRCUIT FOR USE IN PORTABLE TELEPHONE SET

BACKGROUND OF THE INVENTION

The present invention relates to a portable telephone set and, more particularly, to a portable telephone set having a ringing circuit and to be used in a portable mode and mobile mode.

There has been known a portable telephone set which has two use-modes, i.e., a portable mode in which the telephone set is used by a user while bringing it with him and a mobile mode in which it is mounted on a vehicle. In the portable mode, a compact and lightweight, built-in loudspeaker is used. In the mobile mode, a relatively large external loudspeaker is used because the loudspeaker outputs not only a ringing tone but also a voice signal and thus the voice quality therefrom plays an important role.

In general, in the above-mentioned ringing circuit, the built-in, i.e., internal loudspeaker is compact and has narrow frequency characteristics while the external loudspeaker has relatively wide frequnecy characeristics. In the conventional ringing circuit, however, a ringing signal having a single frequency spectrum is used. Thus, when the frequency characteristics of the internal and external loudspeakers are different, there may be a problem that the energy of a ringing signal for driving the loudspeaker cannot be used effectively. More definetely, when the ringing signal spectrum is broad and the internal loudspeaker is used, a portion of the frequency spectrum of the ringing signal which is not used increases and the power consumption of a ringing signal generating circuit is undesirably increased. On the other hand, when the ringing signal frequency spectrum is narrowed to adjust it to the internal loudspeaker, it is impossible to supply enough power to the external loudspeaker, so that an effective ringing sound cannot be generated.

Furthermore, the switching between the internal and external loudspeakers is manually carried out. This manual switching is a troublesome operation for the user.

SUMMARY OF THE INVENTION

An object of the present invention is, therefore, to provide a ringing circuit for use in a portable telephone set which circuit is capable of producing an effective ringing sound for either an internal or external loudspeaker thereof to be used.

Another object of the present invention is to provide a ringing circuit for use in a portable telephone set which circuit automatically switches internal and external loudspeakers based on the use conditions of the portable telephone set.

According to the present invention, there is provided a portable telephone set having two use-modes, portable mode and mobile mode, and includes a mode detecting circuit for detecting the use-modes. Upon a call from a base station, a ringing circuit of the portable telephone set generates a ringing sound from an internal loudspeaker thereof when the portable mode is detected or from an external loudspeaker when the mobile mode is detected. In the portable mode, the ringing circuit produces a first ringing signal having a frequency spectrum adjusted to frequency characteristics of the internal loudspeaker and, in the mobile mode, produces a second ringing signal having a frequency spectrum adjusted to frequency characteristics of the external loudspeaker. The ringing circuit may include two ringing signal generating circuits which generate the first and second ringing signals, respectively. Further, the ringing circuit may include a single ringing signal generating circuit which generates the first or second ringing signal depending upon the use-mode detected. When the external loudspeaker is connected to the telephone set, an input terminal of the mode detecting circuit is grounded simultaneously and this grounding signal can be used as the detection signal of the mode detection circuit.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENT

Figure 1:
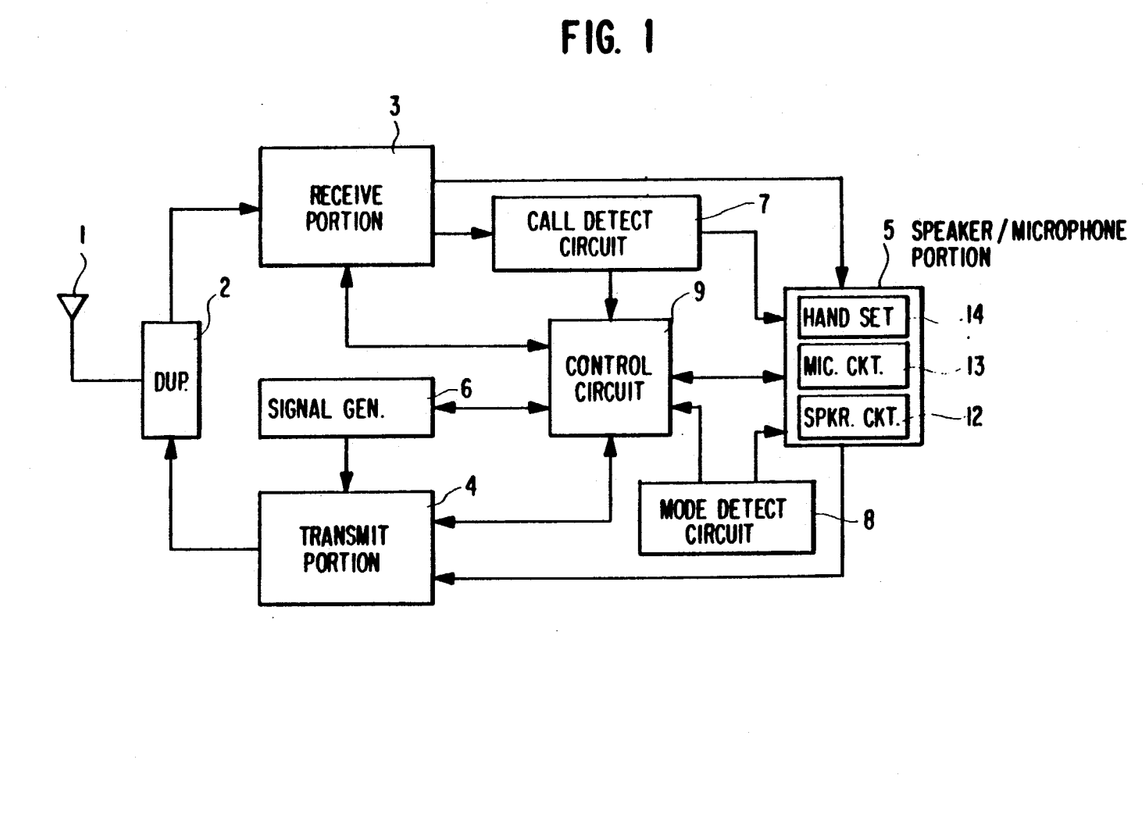
FIG. 1 is a schematic block diagram showing a portable telephone set according to an embodiment of the present invention.

In FIG. 1, a portable telephone set 10 can be carried by the user or mounted on a vehicle. The telephone set 10 has an antenna 1 picking up a radio frequency (RF) signal and radiating an RF signal. The antenna 1 may be replaced by or switched to a vehicle-mounted antenna when the telephone set 10 is mounted on the vehicle. The picked-up RF signal is supplied to a receiver portion 3 through an antenna duplexer 2. The receiver portion 3 demodulates the received RF signal to produce an audio frequency (AF) signal which may include a voice signal and a data signal. The voice signal is supplied to a speaker/microphone portion 5 to be outputted from a speaker circuit 12 or a handset 14 therewithin. The handset 14 may include an earpiece receiver and a mouthpiece microphone. The data signal is supplied to both a call detector circuit 7 and a control circuit 9.

The speaker/microphone portion 5 includes a microphone circuit 13 as well as the speaker circuit 12 and the handset 14. The microphone circuit 13 and speaker circuit 12 are used for the so-called hands-free telephoning in which the user can make conversation through these circuits 12 and 13 without resorting to the handset 14. The hands-free telephoning can be performed only when the telephone set 10 is mounted on a vehicle. In this case, the speaker circuit 12 is used for conversation and for generating an audible ringing tone. When the telephone set 10 is used as a portable one, the handset 14 is used for conversation and the speaker circuit 12 is dedicated to generating an audible ringing tone.

A voice signal is inputted through the microphone circuit 13 or the handset 14 and supplied to a transmitter portion 4. The transmitter portion 4 is also supplied with a data signal from the control circuit 9 and various signals from a signal generator 6. The transmitter portion 4 transmits the supplied signals to a base station (not shown) of a mobile communications system through the duplexer 2 and the antenna 1. The signal generator 6 generates the various signals under the control of control circuit 9. The control circuit 9 also controls the receiver and transmitter portions 3 and 4, especially to cause them to tune to a desired radio frequency channel in a well-known manner.

The call detector circuit 7 detects from the supplied data signal a calling signal addressed to the telephone set 10 and produces a call detection signal. The call detection signal is led to both the control circuit 9 and speaker/microphone circuit 5. In response, the speaker/microphone circuit 5 generates an audible ringing tone through the speaker circuit 12 to alert the user to a call.

The telephone set 10 further includes a mode detect circuit 8 which detects the use condition of the telephone set 10. More specifically, if the telephone set 10 is used as a portable set, the mode detect circuit 8 produces a portable-mode signal. If the telephone set 10 is mounted on a vehicle, the mode detect circuit 8 produces a mobile-mode signal. Upon the mobile-mode signal, the control circuit 9 may switch from the antenna 1 to the vehicle-mounted antenna.

In response to the portable-mode signal, the speaker circuit 12 generates a first audible ringing tone whose frequency is suitable to an internal speaker accommodated in the telephone set 10, which will be described later. On the other hand, in response to the mobile-mode signal, the speaker circuit 12 generates a second audible ringing tone whose frequency is suitable to an external speaker to be connected to the telephone set 10, which will also be described later. Since the frequencies of the ringing tones are so selected, it is possible to produce an audible ringing tone at the maximum level with the minimum power consumption.

Figure 2:
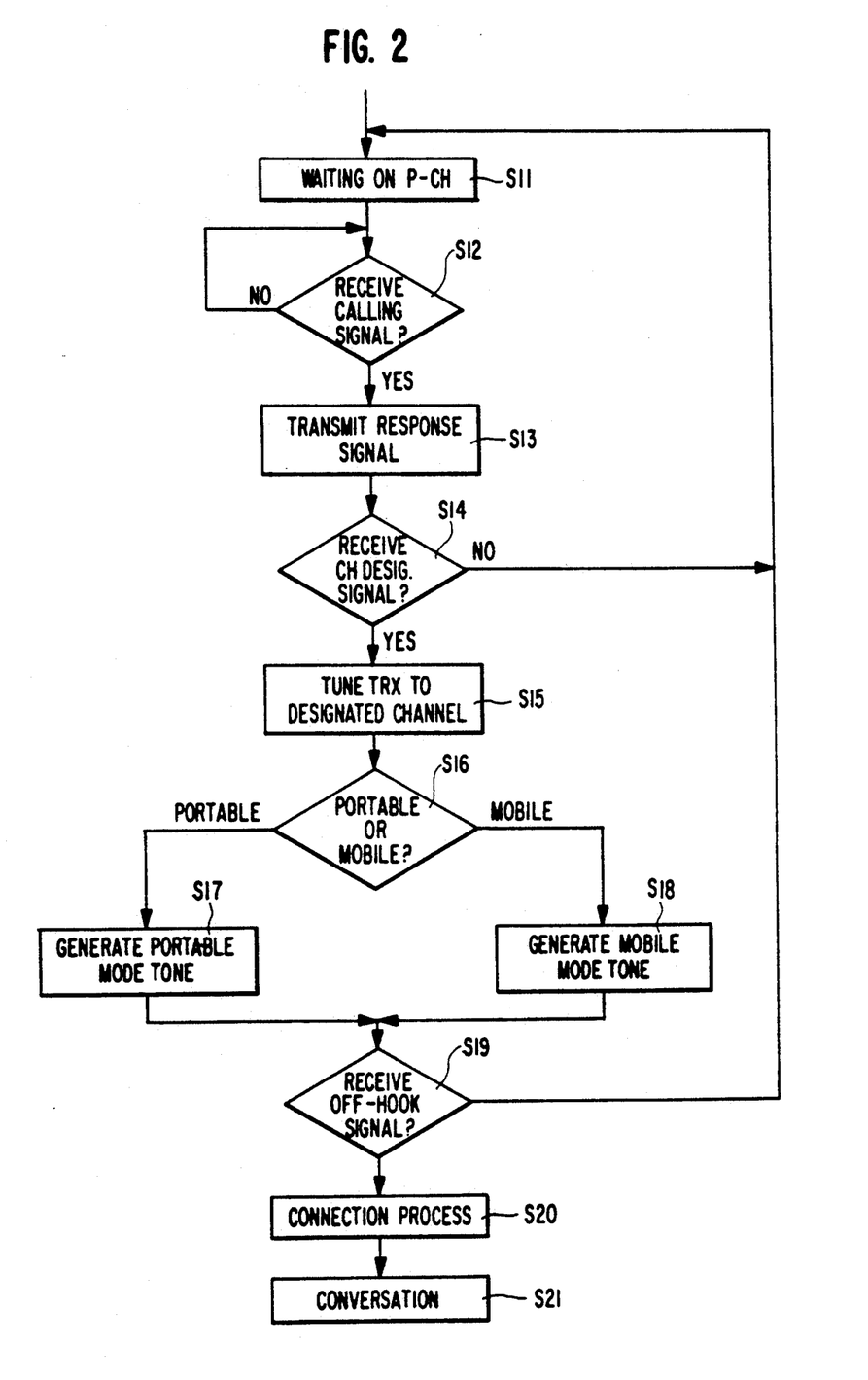
FIG. 2 is a flowchart explaining the call reception operation of the FIG. 1 portable telephone set.

In FIG. 2, the portable telephone set 10 waits at step S11 for a call coming through a so-called paging channel which is one of control channels for broadcasting calling signals and various control signals from a base station to portable or mobile telephone sets. If the telephone set 10 receives a calling signal addressed thereto at step S12 and detects it with the call detect circuit 7, the control circuit 9 causes the signal generator 6 to generate a response signal. The control circuit 9 further causes the transmitter portion 4 to transmit at step S13 the response signal to the base station. Thereafter, the control circuit 9 checks at step S14 if it receives a channel designate signal indicating a designated speech channel. If the control circuit 9 does not receive the channel designate signal within a predetermined period of time, the operation returns to step S11. Otherwise, the control circuit 9 causes the receiver and transmitter portions 3, 4 to tune to the designated speech channel at step S15.

Step S15 is followed by step S16 at which the use condition of telephone set 10 is checked using the mode detect circuit 8. If the set 10 is used as a portable set, the speaker circuit 12 generates a portable-mode ringing tone whose frequency is suitable to the internal loudspeaker at step S17. When the set 10 is mounted on a vehicle, i.e., used as a mobile set, the speaker circuit 12 generates a mobile-mode ringing tone whose frequency is suitable to the external loudspeaker at step S18. Steps S17 and S18 are followed by step S19 at which the control circuit 9 monitors if it receives an off-hock signal indicating that the user goes off-hook to start a telephone conversation. If the off-hook signal is not received within a predetermined period of time, the telephone set 10 returns to the waiting state (step S11).

If the off-hook signal is received at step S19, the control circuit 9 performs at step S20 a connection process in which the handset 14 is connected to the receiver and transmitter portions 3, 4 in the portable mode while the microphone circuit 13 and the speaker circuit 12 are connected to the transmitter and receiver portions 4 and 3, respectively, in the mobile mode. The completion of the connection process allows the user to start a telephone conversation at step S21.

Figure 3:
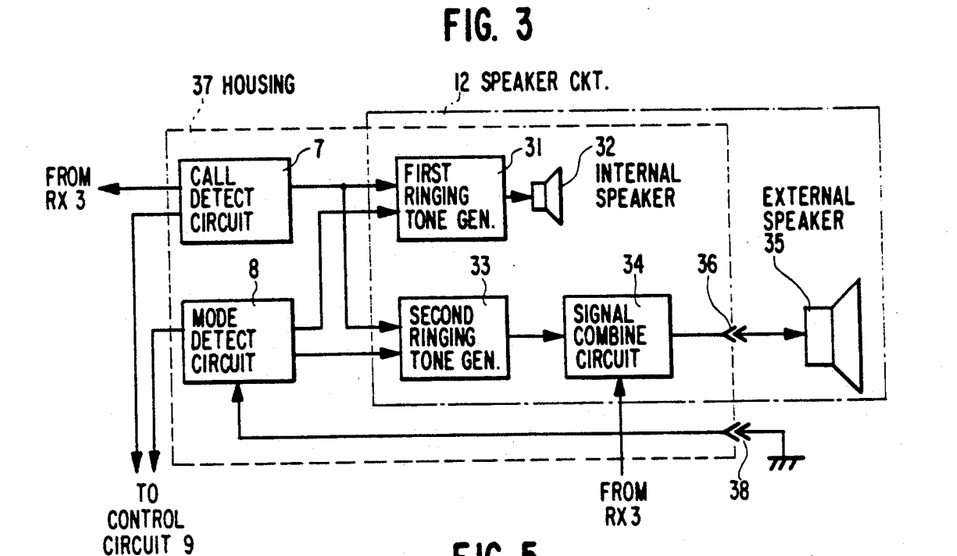
FIG. 3 is a schematic block diagram showing a specific construction of the speaker/microphone of the FIG. 1 embodiment.

In FIG. 3, the speaker circuit 12 included in the speaker/microphone portion 5 comprises a first ringing tone generator 31 for generating a first ringing tone whose frequency is suitable to an internal loudspeaker 32 connected thereto. The speaker circuit 12 also comprises a second ringing tone generator 33 for generating a second ringing tone whose frequency is suitable to an external loudspeaker 35. Between the second ringing tone generator 33 and the external loudspeaker 35 is connected a signal combining circuit 34 for combining the second ringing tone and a voice signal from the receiver 3 (FIG. 1). The external loudspeaker 35 is to be connected to the signal combining circuit 34 through a terminal 36 attached on a telephone set housing 37. While a voice signal is outputted through the external speaker 35 together with the ringing tone in the mobile mode, a voice signal is outputted through the handset 14 (FIG. 1) in the portable mode. In the portable mode, only the ringing tone is outputted from the internal loudspeaker 32.

As mentioned above, the frequency spectrum of the first ringing signal produced by the first ringing tone generator 31 is set so that it substantially corresponds to a relatively narrow frequency characteristics of the internal loudspeaker 32. On the other hand, the frequency spectrum of the second ringing signal generated by the second ringing tone generator 33 is set so that it substantially corresponds to a relatively wide frequency characteristics of the external loudspeaker 35.

A connector 38 mounted on the housing 37 is connected to the mode detecting circuit 8. The connector 38 is grounded when the telephone set, i.e., the housing 37 is mounted on a vehicle. Thus, when the connector 38 is not grounded, the mode detecting circuit 8 detects that the telephone set is in the portable mode while when the connector 38 is grounded, the mode detecting circuit 8 indicates that the telephone set is in the mobile mode. The connector 38 may be constructed such that, when the external loudspeaker 35 is connected through the connector 36 to the signal combining circuit 34, it is grounded simultaneously. The mode detecting circuit 8 provides a portable mode signal indicative of the portable mode to the first ringing tone generator 31 and a mobile mode signal indicative of the mobile mode to the second ringing signal generator 33. The call detecting circuit 7 detects a calling signal from a data signal from the receiving portion 3 and provides a call detection signal indicative of the presence of calling signal reception to both the ringing tone generators 31 and 33.

With the FIG. 3 construction, when the telephone set is in the portable mode and there is a calling signal reception, the first ringing tone generator 31 is operated to send the first ringing signal to the internal loudspeaker 32. In this case, since the frequency spectrum of the first ringing signal corresponds to the frequency characteristics of the internal loudspeaker 32, the first ringing tone generator 31 can operate the internal loudspeaker 32 effectively with minimum power and thus the ringing can be performed effectively. On the other hand, when the telephone set is in the mobile mode and there is a calling signal reception, the second ringing tone generator 33 operates to produce the second ringing signal to the external loudspeaker 35. In this case, since the frequency spectrum of the second ringing signal corresponds to the frequency characteristics of the external loudspeaker 35, the second ringing tone generator 35 actuates the external loudspeaker 35 with full power, so that it is possible to call with maximum volume of the external loudspeaker 35.

Figure 4:
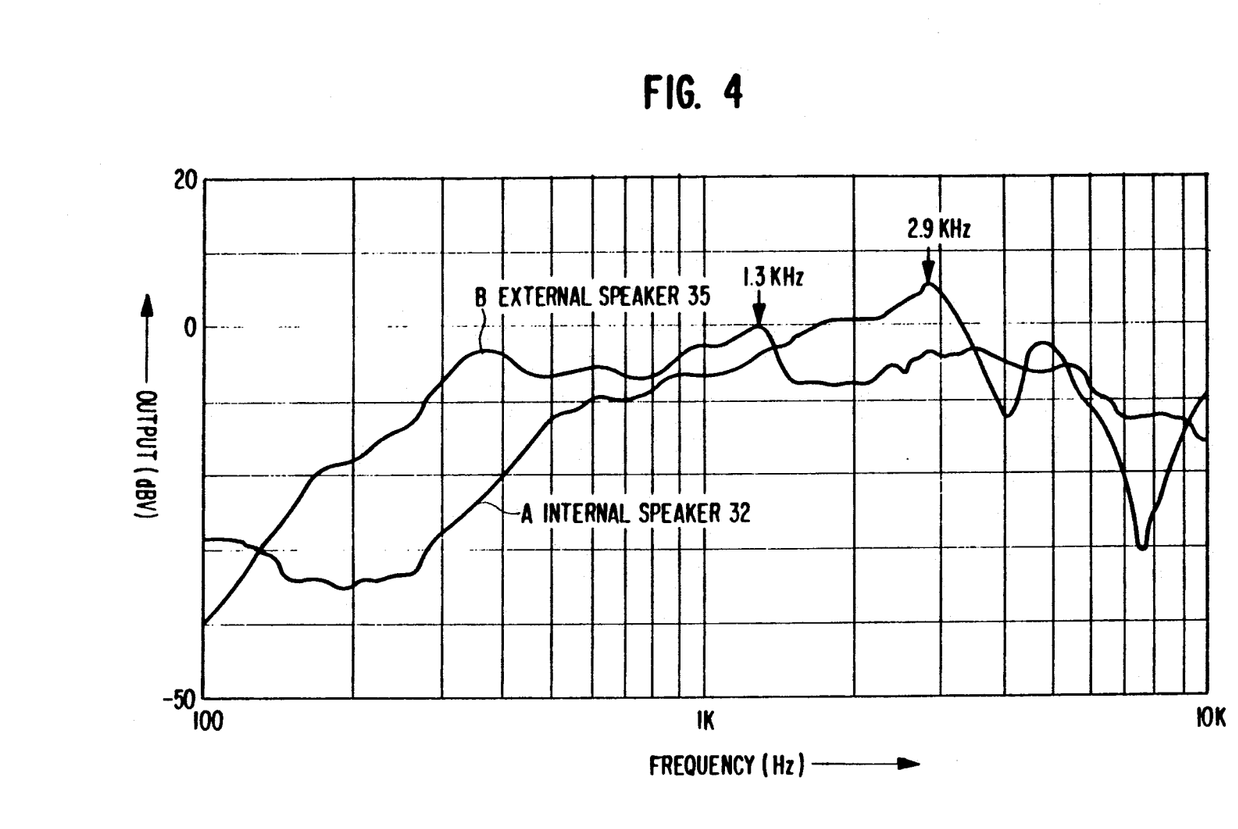
FIG. 4 shows frequency characteristics of an internal loudspeaker and an external loudspeaker which are used in the FIG. 3 embodiment.

Referring to FIG. 4, an example of frequency characteristics of the internal loudspeaker 32 is shown by a curve A and that of the external loudspeaker 35 is shown by a curve B. These data were obtained based on the output voltages of a microphone circuit which picks up sound from the respective loudspeakers under the same measuring conditions. In general, the internal loudspeaker 32 is compact and thus its sound generating efficiency is better in a narrow frequency band. On the other hand, the external loudspeaker 35 does not provide high sound generating efficiency although it exhibits a good frequency characteristics. The curve A indicates that the internal loudspeaker has a sharp peak at 2.9 kHz with its output level being about 5.2 dBV. The curve A also shows that the internal loudspeaker outputs an output level of about −1.5 dBV at 1.5 kHz and of about −3.5 dBV at 1.3 kHz. On the other hand, the curve B exhibits that the external loudspeaker has a relatively wide frequency characteristics and its maximum output point is at 1.3 kHz with level being about 0 dBV. Also, the external loudspeaker outputs an output level of about −7.0 dBV at 1.5 kHz and of −4.0 dBV at 2.9 kHz.

Setting the ringing signal frequency to a single frequency such as 1.5 kHz which is the frequency of ringer of a cable telephone, there is no problem for the external loudspeaker 35 since its frequency at which a high output level is produced is substantially coincident with the ringer frequency. However, for the internal loudspeaker 32, its output level at the ringer frequency is lower than the maximum output level by about 7 dB. When such internal and external loudspeakers 32 and 35 are driven by a ringing tone having such a single frequency, it is impossible to operate the loudspeaker and the ringing tone generator efficiently in either the portable mode or the mobile mode. However, when, as shown in FIG. 4, the frequencies of the first and second ringing tones respectively generated by the ringing tone generators 31 and 33 are set at around 2.9 kHz and around 1.3 kHz, respectively, it is possible to use the loudspeakers 32 and 35 and the ringing tone generators 31 and 33 efficiently. Moreover, each of the first and second ringing tones need not have wide frequency spectra and thus they can use a tone having a single frequency spectrum.

Figure 5:
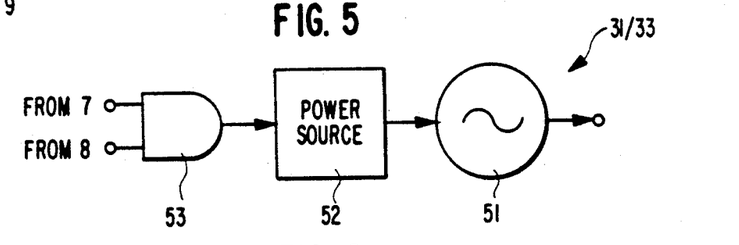
FIG. 5 is a schematic block diagram showing a ringing tone generator of the speaker/microphone portion shown in FIG. 3.

In FIG. 5, each of the ringing tone generators 31 and 33 comprises an oscillator 51 for producing a ringing tone, an oscillator power source 52 for supplying power from a power source to the oscillator 51 and for on-off operating the power source and an AND gate 53 for on-off controlling the oscillator power source 52. To one input of AND gate 53 a calling signal detection signal is supplied from the calling signal detection circuit 7 and to the other input thereof a portable mode or mobile mode signal is supplied from the mode detecting circuit 8. When AND gate 53 receives these inputs, the gate 53 makes the oscillator power source 52 turn on so that the oscillator 51 produces the first or second ringing tone. More specifically, in the first ringing tone generator 31, AND gate 53 makes the power source 52 turn on when the gate 53 receives the calling signal detection signal and the portable mode signal. In the second ringing tone generator 33, AND gate 53 makes the power source 52 turn on when the gate 53 receives the calling signal detection signal and the mobile mode signal.

Figure 6:
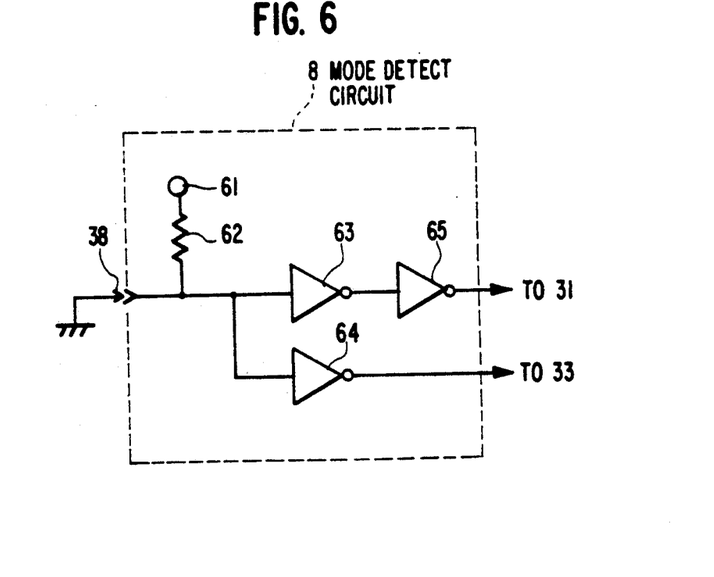
FIG. 6 is a schematic block diagram showing a mode detecting circuit used in the FIG. 3 embodiment.

In FIG. 6, the mode detecting circuit 8 comprises a terminal 61 to which a positive voltage is applied. To the terminal 61 is connected the one end of a pull-up resister 62 the other end of which is connected to the connector 38. To the connector 38 are connected the inputs of inverters 63 and 64. The output of inverter 63 is connected to the input of an inverter 65 whose output is connected to the first ringing tone generator 31. The output of inverter 64 is connected to the second ringing tone generator 33.

In operation, when the connector 38 is grounded, i.e., the telephone set is mounted on a vehicle, the output of inverter 64 becomes a high level indicative of the mobile mode, while the output of inverter 65 becomes a low level. Thus, only the second ringing tone generator 33 is enabled to generate the second ringing tone. In contrast, when the connector 38 is not grounded, i.e., the telephone set is removed from a vehible, the output of the inverter 64 becomes a high level indicative of the portable mode, while the output of inverter 64 becomes a low level. Thus, only the first ringing tone generator 31 is enabled to generate the first ringing tone.

Figure 7:
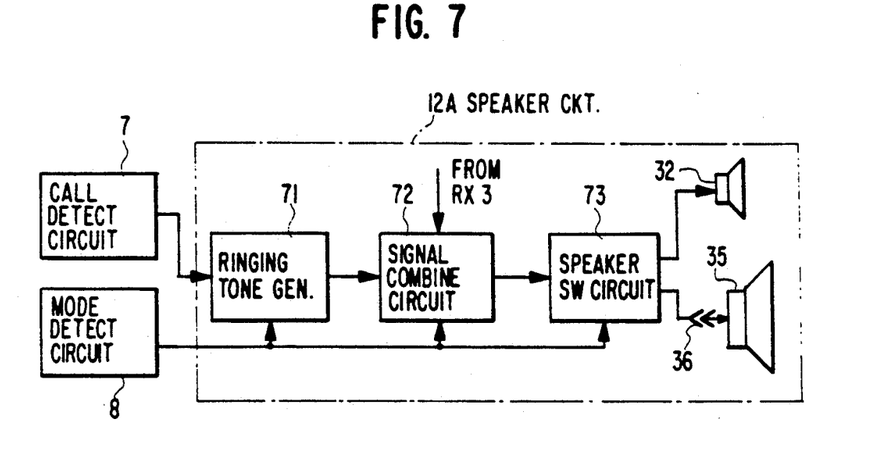
FIG. 7 is a schematic block diagram showing another specific construction of speaker/microphone portion of the FIG. 1 embodiment.

FIG. 7 shows another example of the speaker circuit, denoted by reference numeral 12A, comprising a ringing tone generator 71 which produces the first or second ringing tone according to the use mode of the telephone set. The output of tone generator 71 is supplied to a signal combining circuit 72 to be combined with a voice signal from the receiving portion 3. The output of combining circuit 72 is coupled to a speaker switching circuit 73 which connects the output of signal combining circuit 72 to one of the internal and external loudspeakers 32 and 35. The external loudspeaker 35 is to be connected to the speaker switching circuit 73 through the connector 36.

Although the use mode signal outputted by the mode detecting circuit 8 may include the portable mode signal and the mobile mode signal as described with reference to FIG. 6, here, an output level variation of either of the mode signals is utilized. The ringing tone generator 71 produces the first ringing tone when the use mode signal is the portable mode signal and the calling signal detection signal is supplied. The generator 71 also generates the second ringing tone when the use mode signal is the mobile mode signal and the calling signal detection signal is supplied. The signal combining circuit 72 combines the voice signal and the second ringing tone when the use mode signal is the mobile mode signal while it merely passes therethrough the first ringing tone when the use mode signal is the portable mode signal. The output terminal of the speaker switching circuit 73 is switched to the internal loudspeaker 32 when the use mode is the portable mode and to the external loudspeaker 35 when it is the mobile mode. Therefore, the ringing tone generator 71 of the speaker circuit 12 produces two kinds of ringing tone.

Figure 8:
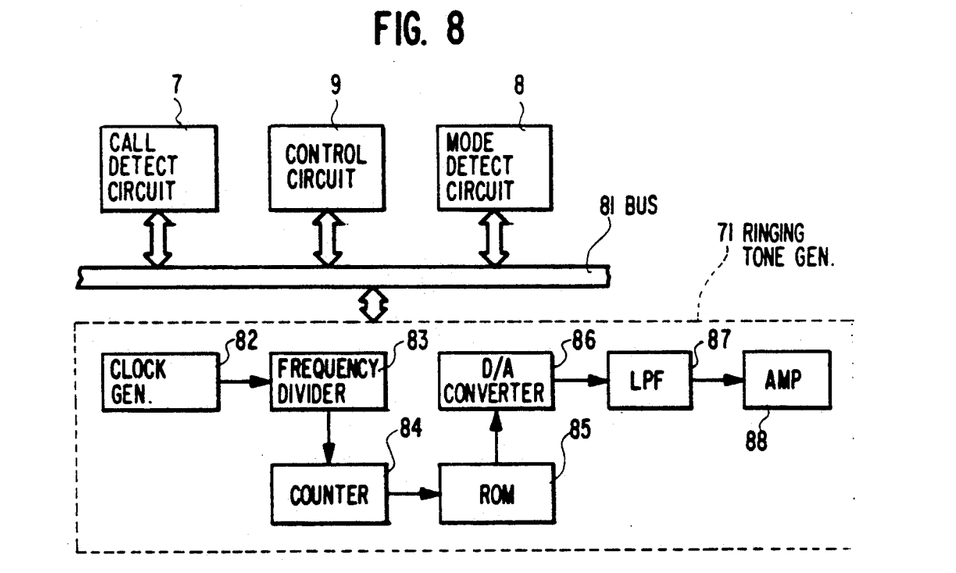
FIG. 8 is a schematic block diagram showing a ringing tone generator of the speaker/microphone portion shown in FIG. 7.

In FIG. 8, the ringing tone generator 71 is connected through a bus 81 to the control circuit 9, which may comprise a microprocessor, the calling signal detection circuit 7 and the mode detecting circuit 8. The ringing tone generator 71 comprises a clock generator 82 for generating a clock signal. The clock signal is supplied to a frequency divider 83 at which the clock signal is frequency divided. The divided clock signal is counted by a counter 84 whose output is applied to a read-only memory (ROM) 85. ROM 85 preliminarily stores patterns corresponding to the first and second ringing tone frequencies and provides one of the stored patterns according to the output of counter 84. The output pattern of ROM 85 is supplied to a D/A converter 86 which converts the supplied patterns into a sinusoidal wave signal containing high harmonics. A low-pass filter (LPF) 87 eliminates the high harmonics contained in the output of D/A converter 86 to provide a basic sinusoidal wave signal and an amplifier 88 amplifies the basic sinusoidal wave signal.

The frequency divider 83 divides the frequency of the clock signal by a first frequency-dividing ratio when the portable mode signal is supplied from the mode detecting circuit 8 and the calling signal detection signal is supplied from the signal receive detecting circuit 7. On the other hand, when the mobile mode signal and the calling signal detection signal are supplied, the frequency divider 83 divides the clock signal by a second frequency-dividing ratio. The counter 84 is used as a decoder for assigning addresses for ROM 85 and the output of counter 84 when counted with the first frequency-dividing ratio reads the pattern corresponding to the first ringing tone frequency stored in ROM 85. On the other hand, the output of counter 84 when counted with the second frequency-dividing ratio reads the pattern corresponding to the second ringing tone frequency stored in ROM 85. In this manner, the two kinds of ringing tone can be digitally produced.

As described hereinbefore, the ringing circuit of the portable telephone set according to the present invention includes the ringing tone generators for generating the first and second ringing tones whose frequencies are set to be suitable to frequency characteristics of the internal loudspeaker to be used in the portable mode and of the external loudspeaker to be used in the mobile mode, respectively. The ringing tone is selected according to the use mode of the telephone set in which the associated loudspeaker is actuated. Therefore, it is possible to utilize the ringing tone effectively in either mode and to provide maximum ringing with minimum power consumption.

What is claimed is:

1. A portable telephone set comprising:
    means for receiving a radio frequency signal to produce a received signal;
    means for detecting a calling signal out of said received signal to produce a calling signal detection signal;
    mode detecting means for detecting the use mode of said portable telephone set to produce portable-mode and mobile-mode signals when said telephone set is in portable and mobile modes, respectively;
    an internal loudspeaker housed in said portable telephone set;
    an external loudspeaker having a frequency characteristic different from that of said internal loudspeaker and adapted to be connected to a first connector provided on said telephone set when said portable telephone set is in the mobile mode; and
    ringing signal generator means for generating a first ringing signal having a frequency spectrum corresponding to said frequency characteristic of said internal loudspeaker in response to said portable-mode signal and said calling signal detection signal and for generating a second ringing signal having a frequency spectrum corresponding to said frequency characteristic of said external loudspeaker in response to said mobile-mode signal and said calling signal detection signal.

2. A portable telephone set as claimed in claim 1, wherein said ringing signal generator means comprises:
    a first ringing signal generating circuit for generating said first ringing signal in response to said portable-mode signal and to said calling signal detection signal; and
    a second ringing signal generating circuit for generating said second ringing signal in response to said portable-mode signal and to said calling signal detection signal.

3. A portable telephone set as claimed in claim 1, wherein said ringing signal generator means comprises:
    a clock generator for generating a clock signal;
    a frequency divider for frequency dividing said clock signal by a first ratio in response to said portable-mode signal and by a second ratio in response to said mobile-mode signal to produce first and second divided signals, respectively;
    a counter for counting said first and second divided signals to produce first and second addresses, respectively;
    a ROM for providing first and second pattern signals in response to said first and second addresses, respectively; and
    an A/D converter for respectively converting said first and second pattern signals into first and second analog signals corresponding respectively to said first and second ringing signals.

4. A portable telephone set as claimed in claim 1, wherein said mode detecting circuit comprises a second connector provided on said telephone set and means for providing said mobile-mode signal when said second connector is grounded.

5. A portable telephone set as claimed in claim 4, wherein said second connector is grounded when said external loudspeaker is connected to said first connector.

6. A telephone set comprising:
    means for receiving a radio frequency signal to produce a received signal;
    means for detecting a calling signal out of said received signal to produce a calling signal detection signal;

mode detect means for detecting the use mode of said telephone set to produce a portable-mode signal when said telephone set is used as a portable set and to produce a mobile-mode signal when said telephone set is mounted on a vehicle;

first and second speaker means having first and second frequency characteristics, respectively;

first generator means responsive to said calling signal detection signal and to said portable-mode signal for generating a first ringing tone suitable to said first frequency characteristic and supplying said first ringing tone to said first speaker means; and second generator means responsive to said calling signal detection signal and to said mobile-mode signal for generating a second ringing tone suitable to said second frequency characteristic and supplying said second ringing tone to said second speaker means.

7. A telephone set as claimed in claim 6, wherein said first speaker means comprises a first loudspeaker built in a housing of said telephone set, and wherein said second speaker means comprises a second loudspeaker to be coupled to said telephone set.

8. A telephone set as claimed in claim 6, wherein said first and second frequency characteristics differ from each other.

9. A telephone set as claimed in claim 8, wherein said first frequency characteristic has a peak output level at about 2.9 kHz, and wherein said second frequency characteristic has a peak output level at about 1.3 kHz.

10. A telephone set as claimed in claim 6, wherein each of said first and second generator means comprises: an AND gate having two input terminals to be supplied with said calling signal detection signal and the output of said mode detect means, respectively; a tone generator; and power source means responsive to the output of said AND gate for applying power to said tone generator.

11. A telephone set as claimed in claim 6, wherein said mode detect means comprises: a terminal to be connected to ground when said telephone set is mounted on a vehicle; a pull-up resistor connected between said terminal and a positive potential; a first inverter whose input is connected to said terminal; a second inverter whose input and output are connected to said terminal and said second generator means, respectively; and a third inverter whose input and output are connected to the output of said first inverter and said first generator means, respectively.

12. A telephone set as claimed in claim 6, further comprising means to be connected between said second generator means and said second speaker means for combining said second ringing tone and a voice signal.

13. A telephone set comprising:

an internal loudspeaker;

a first terminal to be connected to an external speaker;

means for receiving a radio frequency signal to produce a received signal;

means for detecting a calling signal out of said received signal to produce a calling signal detection signal;

mode detecting means for detecting the use mode of said telephone set to produce portable-mode and mobile-mode signals when said telephone set is in portable and mobile modes, respectively; and generator means responsive to said portable-mode and mobile-mode signals and said calling signal detection signal for generating first and second ringing signals, respectively, and providing said first and second ringing signals to said internal and external loudspeakers, respectively.

14. A telephone set as claimed in claim 13, further comprising a second terminal to be connected to ground when said telephone set is in said mobile mode, and wherein said mode detect means comprises: means for generating said portable-mode signal when said second terminal is not connected to ground and generating said mobile-mode signal when said second terminal is connected to ground.

15. A method of supplying a ringing signal to an internal loudspeaker built in a telephone set and to an external loudspeaker to be connected to said telephone set, comprising the steps of:

detecting a calling signal addressed to said telephone set to produce a calling detection signal;

detecting the use mode of said telephone set to produce portable-mode and mobile-mode signals when said telephone set is in portable and mobile modes, respectively;

responsive to said portable-mode and mobile-mode signals, generating portable-mode and mobile-mode ringing signals, respectively, the frequencies of said portable-and mobile-mode ringing signals being suitable to said internal and external loudspeakers, respectively;

responsive to said calling detection signal and to said portable-mode signal, supplying said portable-mode ringing signal to said internal loudspeaker; and responsive to said calling detection signal and to said mobile-mode signal, supplying said mobile-mode ringing signal to said external loudspeaker.

16. A method as claimed in claim 15, further comprising the step of, responsive to said calling detection signal and to said mobile-mode signal, supplying both said mobile-mode ringing signal and a voice signal to said external loudspeaker.

* * * * *